2,951,083
Patented Aug. 30, 1960

2,951,083
PRODUCTION OF MUCOCHLORIC ANHYDRIDE

Everett E. Gilbert, Morris Township, and Pasquale Lombardo, Newark, N.J., assignors to Allied Chemical Corporation, a corporation of New York No Drawing. Filed Apr. 9, 1958, Ser. No. 727,236

6 Claims. (Cl. 260—343.6)

This invention relates to an improved process for the production of mucochloric anhydride. More particularly, the invention relates to an improved process for the production of mucochloric anhydride by dehydrating mucochloric acid in the presence of certain organic solvents as reaction media.

As disclosed in a copending application of Everett E. Gilbert, U.S. Serial No. 621,533, filed November 13, 1956, mucochloric anhydride is a highly effective fungicide, exhibiting particularly outstanding control of apple scab and tomato blight.

Mowry, in Journal of the American Chemical Society, vol. 72 (1950), page 2537, discloses the production of mucochloric anhydride by refluxing mucochloric acid, in the presence of (1) a mixture of benzene and dioxane as reaction medium and (2) benzenesulfonic acid as catalyst, for a reaction period of 20 hours. However, when it was attempted to duplicate the process disclosed by Mowry, substantial yields of mucochloric anhydride were not obtained.

An object of the present invention is to provide an improved process for the production of mucochloric anhydride.

A further object of the invention is to provide an improved process for the production of mucochloric anhydride by refluxing mucochloric acid in the presence of certain organic solvents as reaction media.

Additional objects and advantages of the invention will become apparent from the following description and examples.

According to the present invention, mucochloric anhydride is produced by refluxing mucochloric acid, in the presence of (1) a reaction medium comprising a member of the group consisting of dichlorobenzenes melting below 50° C., trichlorobenzenes melting below 50° C. and ortho-chlorotoluene, and (2) a catalyst comprising a sulfonic acid. The economic advantages of this process are substantial since it permits the obtainment of mucochloric anhydride in improved yield, even with reaction periods of relatively short duration. Further, the particular reaction media employed, unlike other solvents, do not favor the formation of undesirable tar during the reaction.

The reaction which occurs in the process of this invention may be illustrated by the following equation:

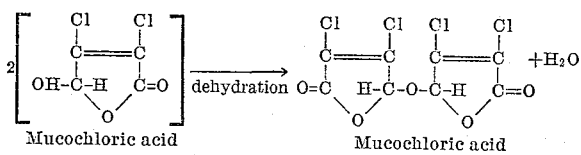

Organic solvents which may be employed as reaction media in the present invention include dichlorobenzenes and trichlorobenzenes melting below 50° C. and ortho-chlorotoluene. Particularly outstanding results have been obtained employing ortho-dichlorobenzene, 1,2,4-trichlorobenzene and ortho-chlorotoluene. Other suitable reaction media include meta-dichlorobenzene, mixtures of isomers of dichlorobenzene melting below 50° C. and mixtures of isomers of trichlorobenzene melting below 50° C.

The organic solvents of this invention possess many common properties. Each solvent is chemically inert to mucochloric acid and mucochloric anhydride under the reaction conditions. Further, each solvent has a boiling point between about 160° C. and 225° C. and melts below about 50° C. However, the exact theory on which the successful utilization of the solvents depends is not known since other organic solvents possessing the same properties have failed to produce the desired results of the invention, i.e., the obtainment of improved yields of mucochloric anhydride with rapid rates of reaction and with substantially no formation of tar during the reaction.

Although it is preferred to employ about 1 to 5 parts by weight of reaction medium to each part by weight of mucochloric acid, higher and lower weight ratios may be used. However, when the weight ratio of reaction medium to mucochloric acid is substantially above about 5 to 1, rate of reaction decreases to an impractical extent. Also, at weight ratios of reaction medium to mucochloric acid substantially below about 1 to 1, tar formation is favored.

Any sulfonic acid having solubility in the reaction medium may be suitably employed as catalyst in the process of the present invention. These sulfonic acids may be aliphatic, aromatic or heterocyclic. Suitable catalysts include benzenesulfonic acid, para-toluenesulfonic acid, and ortho-dichlorobenzenesulfonic acid. Preferred catalysts are the sulfonic acids of the aromatic solvent used; these may be conveniently made in situ by adding sulfur trioxide to the solvent.

Generally, the amount of catalyst employed is about 0.25 to 20 percent by weight, preferably about 1 to 10 percent by weight, of the mucochloric acid. As the catalyst concentration is increased, the rate of reaction also tends to increase. However, use of more than about 10 percent by weight of catalyst produces no additional advantageous results and tends to become uneconomical.

The process of the present invention is readily carried out by refluxing mucochloric acid, with stirring, in the presence of the reaction medium defined above and a sulfonic acid catalyst, for a period of about 1 to 7 hours, preferably about 1 to 5 hours. The reaction takes place at substantially atmospheric pressure and at temperatures of about 160° to 225° C., depending on the boiling point of the particular reaction medium employed.

After the reaction has been completed, the crude reaction product may be treated by any suitable procedure to recover the desired mucochloric anhydride. For example, the reaction product may be chilled to precipitate mucochloric anhydride and unreacted mucochloric acid. The precipitate is then separated from the mother liquor containing reaction medium by filtering, centrifuging or the like. This mother liquor may be recycled to the dehydration step together with fresh reaction medium. The precipitate is washed with hot water to remove unreacted mucochloric acid and is finally dried to produce relatively pure (over 90%) mucochloric anhydride, suitable for commercial application. The recovered unreacted mucochloric acid may be crystallized from the water and recycled together with fresh mucochloric acid to the dehydration step.

The present invention may be illustrated by reference to the following examples:

*Example 1.*—A mixture of 105.6 grams of mucochloric acid, 300 cc. of ortho-dichlorobenzene and 8.3 cc. of a 13.5% by weight solution of "Sulfan" (stabilized liquid sulfur trioxide) in ortho-dichlorobenzene was refluxed in a vessel provided with a stirrer, reflux trap (Dean and Stark) and reflux condenser. Refluxing was carried out at a temperature of about 185° C. for 4¾ hours. 4 cc. of water (theory—5.6 cc.) were collected during the reaction.

The reaction mixture was cooled in ice and filtered. The resultant precipitate was washed twice with hexane and three times with boiling water to remove solvent and unreacted mucochloric acid. Upon drying the precipitate, 69 grams of relatively pure mucochloric anhydride (M.P. 139–143° C.) were obtained. This represented a yield of 68.9% of theory, based on the mucochloric acid fed.

*Example 2.*—A mixture of 15.8 grams of mucochloric acid, 45 cc. of ortho-chlorotoluene and 1.25 cc. of a 13.5% by weight solution of "Sulfan" (stabilized liquid sulfur trioxide) in ortho-chlorotoluene was refluxed in a vessel provided with a stirrer, reflux trap (Dean and Stark) and reflux condenser. The mixture was refluxed at a temperature of 165–170° C. for 4¾ hours. 0.7 cc. of water (theory 0.85 cc.) was collected during the reaction.

The reaction mixture was cooled in ice and filtered. The resultant precipitate was washed twice with hexane and three times with boiling water to remove solvent and unreacted mucochloric acid. Upon drying the precipitate, 12 grams of relatively pure mucochloric anhydride (M.P. 138–145° C.) were obtained. This yield of anhydride was 85.1% of theory, based on the mucochloric acid fed.

*Example 3.*—A mixture of 105.6 grams of mucochloric acid, 300 cc. of 1,2,4-trichlorobenzene and 8.3 cc. of a 13% by weight solution of "Sulfan" (stabilized liquid sulfur trioxide) in 1,2,4-trichlorobenzene was refluxed in a vessel provided with a stirrer, reflux trap (Dean and Stark) and reflux condenser. The mixture was refluxed for 4¾ hours at about 220° C. 5 cc. of water (theory 5.6 cc.) were collected during the reaction.

The reaction mixture was cooled in ice and filtered. The resultant precipitate was washed twice with hexane and three times with boiling water to remove solvent and unreacted mucochloric acid. Upon drying the precipitate, 62 grams of relatively pure mucochloric anhydride (M.P. 137–139° C.) were obtained. This calculated to a yield of 62% of theory, based on the mucochloric acid fed.

*Example 4.*—A series of recycle runs was made using 105.5 grams of mucochloric acid, 360 cc. of ortho-dichlorobenzene as reaction medium and the reaction product of "Sulfan" (stabilized liquid sulfur trioxide) and orthodichlorobenzene as catalyst (initially the catalyst was made by forming a 12% by weight solution of "Sulfan" in ortho-dichlorobenzene). Each run was carried out at the reflux temperature of ortho-dichlorobenzene, i.e., 180° to 185° C., in a vessel provided with a stirrer, reflux trap (Dean and Stark) and reflux condenser.

After the end of each reaction period, the crude reaction product was cooled, precipitating mucochloric anhydride and unreacted mucochloric acid. The precipitated material was filtered off. The filtrate was made up to about 360 cc. with fresh ortho-dichlorobenzene and recycled. "Sulfan" was added for makeup catalyst.

The filter cake was washed three times with petroleum ether and air dried. The dried material was then boiled in 400 cc. of water, filtered and washed twice with hot water, thereby removing unreacted mucochloric acid and forming relatively pure mucochloric anhydride product. The filtrate was extracted with ether, and unreacted mucochloric acid was recovered by evaporation. This recovered mucochloric acid was recycled together with fresh mucochloric acid for use in the succeeding run.

The results may be summarized in the following table:

*Table I*

| Run | Mucochloric Acid (grams) | "Sulfan" (cc.) | Time (hours) | H₂O¹ Collected (cc.) | Mucochloric Anhydride (M.P., °C.) |
|---|---|---|---|---|---|
| (1) | 105.5 | 1.2 | 1 | 5.0 | 137–145 |
| (2) | 105.5 | 0.12 | 2 | | 138–143 |
| (3) | 105.5 | 0.6 | 3.3 | 4.8 | 139–150 |
| (4) {fresh | 38.5 | 0 | 3 | 5.2 | 138–146 |
| {recovered | 67.0 | | | | |
| (5) {fresh | 86.5 | 0 | 3 | 5.1 | 138–145 |
| {recovered | 19.0 | | | | |
| (6) {fresh | 82.5 | 0.6 (after 3.5 hrs.) | 5 | 5.4 | 135–145 |
| {recovered | 23.0 | | | | |
| (7) {fresh | 78.5 | 0.6 | 2.5 | 5.0 | 136–150 |
| {recovered | 27.0 | | | | |

¹ Theory—5.7 cc.

A total mucochloric anhydride yield of 467 grams (88% of theory, based on the mucochloric acid consumed) was obtained after drying the combined products at 105° C. to constant weight.

While we have described preferred embodiments for carrying out the process of our invention, it will be apparent that many changes may be made without departing from the spirit of the invention.

We claim:

1. A process for the production of mucochloric anhydride which comprises refluxing mucochloric acid, in the presence of (1) a reaction medium consisting essentially of a member of the group consisting of dichlorobenzenes melting below 50° C., trichlorobenzenes melting below 50° C. and ortho-chlorotoluene, and (2) a catalyst selected from the group consisting of benzenesulfonic acid, dichlorobenzenesulfonic acids, trichlorobenzenesulfonic acids, toluenesulfonic acids and chlorotoluenesulfonic acids.

2. A process for the production of mucochloric anhydride which comprises refluxing mucochloric acid, in the presence of (1) a reaction medium consisting essentially of a member of the group consisting of dichlorobenzenes melting below 50° C., trichlorobenzenes melting below 50° C. and ortho-chlorotoluene, and (2) a catalyst selected from the group consisting of benzenesulfonic acid, dichlorobenzenesulfonic acids, trichlorobenzenesulfonic acids, toluenesulfonic acids and chlorotoluenesulfonic acids, for a reaction period of about 1 to 7 hours, and recovering mucochloric anhydride from the resulting reaction product.

3. A process for the production of mucochloric anhydride which comprises refluxing mucochloric acid, in the presence of (1) a reaction medium consisting essentially of a member of the group consisting of dichlorobenzenes melting below 50° C., trichlorobenzenes melting below 50° C. and ortho-chlorotoluene, the weight ratio of said reaction medium to mucochloric acid being about 1–5 to 1, and (2) a catalyst selected from the group consisting of benzenesulfonic acid, dichlorobenzenesulfonic acids, trichlorobenzenesulfonic acids, toluenesulfonic acids and chlorotoluenesulfonic acids, for a reaction period of about 1 to 7 hours, and recovering mucochloric anhydride from the resulting reaction product.

4. A process for the production of mucochloric anhydride which comprises refluxing mucochloric acid, in the presence of (1) a reaction medium consisting essentially of ortho-dichlorobenzene, the weight ratio of said reaction medium to mucochloric acid being about 1–5 to 1, and (2) a catalyst selected from the group consisting of benzenesulfonic acid, dichlorobenzenesulfonic acids, trichlorobenzenesulfonic acids, toluenesulfonic acids and chlorotoluenesulfonic acids, for a reaction period of about 1 to 7 hours, and recovering mucochloric anhydride from the resulting reaction product.

5. A process for the production of mucochloric anhydride which comprises refluxing mucochloric acid, in the presence of (1) a reaction medium consisting essentially of 1,2,4-trichlorobenzene, the weight ratio of said reaction medium to mucochloric acid being about 1-5 to 1, and (2) a catalyst selected from the group consisting of benzenesulfonic acid, dichlorobenzenesulfonic acids, trichlorobenzenesulfonic acids, toluenesulfonic acids and chlorotoluenesulfonic acids, for a reaction period of about 1 to 7 hours, and recovering mucochloric anhydride from the resulting reaction product.

6. A process for the production of mucochloric anhydride which comprises refluxing mucochloric acid, in the presence of (1) a reaction medium consisting essentially of ortho-chlorotoluene, the weight ratio of said reaction medium to mucochloric acid being about 1-5 to 1, and (2) a catalyst selected from the group consisting of benzenesulfonic acid, dichlorobenzenesulfonic acids, trichlorobenzenesulfonic acids, toluenesulfonic acids and chlorotoluenesulfonic acids, for a reaction period of about 1 to 7 hours, and recovering mucochloric anhydride from the resulting reaction product.

References Cited in the file of this patent

Glasstone: Textbook of Physical Chem., p. 1087, D. Van Nostrand, New York (1946).

Mowry: J. Am. Chem. Soc., vol. 72, pp. 2535-7 (1950).